US012590355B2

(12) United States Patent　(10) Patent No.: US 12,590,355 B2
Otsuki et al.　(45) Date of Patent: Mar. 31, 2026

(54) HYDROGEN STORAGE MATERIAL, HYDROGEN STORAGE CONTAINER, AND HYDROGEN SUPPLY APPARATUS

(71) Applicant: SANTOKU CORPORATION, Kobe (JP)

(72) Inventors: Takayuki Otsuki, Kobe (JP); Hiroki Hayashi, Kobe (JP); Yoshiharu Takata, Kobe (JP); Shinji Ikeuchi, Kobe (JP); Noboru Nishigaki, Kobe (JP)

(73) Assignee: SANTOKU CORPORATION, Kobe (JP)

( * ) Notice: Subject to any disclaimer, the term of this patent is extended or adjusted under 35 U.S.C. 154(b) by 381 days.

(21) Appl. No.: 18/022,655

(22) PCT Filed: Aug. 31, 2021

(86) PCT No.: PCT/JP2021/031915
§ 371 (c)(1),
(2) Date: Feb. 22, 2023

(87) PCT Pub. No.: WO2022/050268
PCT Pub. Date: Mar. 10, 2022

(65) Prior Publication Data
US 2024/0034622 A1　Feb. 1, 2024

(30) Foreign Application Priority Data
Sep. 1, 2020　(JP) ................................. 2020-147154

(51) Int. Cl.
*C22C 19/03*　(2006.01)
*B22F 1/068*　(2022.01)
(Continued)

(52) U.S. Cl.
CPC .............. *C22C 19/03* (2013.01); *B22F 1/068* (2022.01); *B22F 1/142* (2022.01); *B22F 9/04* (2013.01);
(Continued)

(58) Field of Classification Search
CPC ...... C01B 3/0057; H01M 4/383; Y02E 60/32; C22C 19/007; C22C 19/03; C22C 2202/04
See application file for complete search history.

(56) References Cited

U.S. PATENT DOCUMENTS 4,744,946 A　5/1988　Sasai et al.
5,496,424 A *　3/1996　Fujitani ................... C22C 19/03
　　　　　　　　　　　　　　　　148/501
6,066,415 A　5/2000　Sakai et al.

FOREIGN PATENT DOCUMENTS

CN　　104518204 A *　4/2015　............ H01M 10/30
CN　　108048693 A *　5/2018　............. C22C 19/03
(Continued)

OTHER PUBLICATIONS

Ma J., et al; "A novel method to improve the electrochemical properties of hydrogen storage electrode alloy"; J. of Jinshu Xuebao/ Acta Metallurgica Sinica; vol. 37, Issue 1, 2001 (Year: 2001).*
(Continued)

*Primary Examiner* — Sally A Merkling
*Assistant Examiner* — Austin Pollock
(74) *Attorney, Agent, or Firm* — Sughrue Mion, PLLC

(57)　　　ABSTRACT

Hydrogen storage materials being inexpensive and having hydrogen absorption (storage) and desorption properties suitable for hydrogen storage are provided. The hydrogen storage materials have alloys with an elemental composition of Formula (1), a hydrogen storage container containing the
(Continued)

hydrogen storage material, and a hydrogen supply apparatus including the hydrogen storage container:

$$La_a Ce_b Sm_c Ni_d M_e \qquad (1)$$

wherein M is Mn or both of Mn and Co, a satisfies $0.60 \leq a \leq 0.90$, b satisfies $0 \leq b \leq 0.30$, c satisfies $0.05 \leq c \leq 0.25$, d satisfies $4.75 \leq d \leq 5.20$, e satisfies $0.05 \leq e \leq 0.40$, $a+b+c=1$, and $d+e$ satisfies $5.10 \leq d+e \leq 5.35$.

5 Claims, 2 Drawing Sheets

(51) Int. Cl.

| | |
|---|---|
| *B22F 1/142* | (2022.01) |
| *B22F 9/04* | (2006.01) |
| *B22F 9/08* | (2006.01) |
| *C01B 3/00* | (2006.01) |
| *C01B 3/0047* | (2026.01) |
| *C22C 1/02* | (2006.01) |
| *C22C 19/00* | (2006.01) |

(52) U.S. Cl.

CPC .............. *B22F 9/08* (2013.01); *C01B 3/0057* (2013.01); *C22C 1/02* (2013.01); *C22C 19/007* (2013.01); *B22F 2201/11* (2013.01); *B22F 2301/155* (2013.01); *C22C 2202/04* (2013.01)

(56) References Cited

FOREIGN PATENT DOCUMENTS

| | | | | | |
|---|---|---|---|---|---|
| CN | 110714139 A | * | 1/2020 | ............ | C22C 19/03 |
| CN | 111082037 A | * | 4/2020 | ............ | H01M 10/28 |
| CN | 111118341 A | * | 5/2020 | .............. | C21D 9/46 |
| CN | 111118342 A | * | 5/2020 | .............. | C22F 1/02 |
| CN | 111118345 A | * | 5/2020 | ............ | H01M 4/383 |
| CN | 111471892 A | * | 7/2020 | ............ | H01M 10/30 |
| CN | 111471894 A | * | 7/2020 | ................ | C22F 1/02 |
| CN | 111471913 A | * | 7/2020 | ............ | C22C 30/00 |
| EP | 0 591 952 A1 | | 4/1994 | | |
| JP | 60-070154 A | | 4/1985 | | |
| JP | 63-47345 A | | 2/1988 | | |
| JP | 4-006236 A | | 1/1992 | | |
| JP | 10-321223 A | | 12/1998 | | |
| JP | 2006220234 A | * | 8/2006 | ............ | H01M 10/30 |
| WO | 2007/034892 A1 | | 3/2007 | | |
| WO | WO-2020115953 A1 | * | 6/2020 | ................ | B22F 1/00 |

OTHER PUBLICATIONS

Extended European Search Report issued Aug. 30, 2024 in Application No. 21864326.0.

International Search Report for PCT/JP2021/031915 dated Nov. 22, 2021.

* cited by examiner

PCT CURVE (20℃)

1

HYDROGEN STORAGE MATERIAL, HYDROGEN STORAGE CONTAINER, AND HYDROGEN SUPPLY APPARATUS

CROSS REFERENCE TO RELATED APPLICATIONS

This application is a National Stage of International Application No. PCT/JP2021/031915 filed Aug. 31, 2021, claiming priority based on Japanese Patent Application No. 2020-147154 filed Sep. 1, 2020.

TECHNICAL FIELD

The present invention relates to a hydrogen storage material, a hydrogen storage container, and a hydrogen supply apparatus.

BACKGROUND ART

Hydrogen storage(absorbing) alloys are alloys capable of reversibly absorbing and desorbing hydrogen and have already been used as negative electrode materials for nickel hydrogen secondary batteries. Recently, hydrogen storage alloys have been attracted attention as energy storage methods for hydrogen economy, and various research are also ongoing for utilization of hydrogen storage and supply systems with hydrogen storage materials. Various types of the hydrogen storage alloys are reported such as the AB5-type, the AB2-type, the TiFe-type, and the BCC-type such as TiVCr. Among these alloys, the AB5-type alloys are known for easiness of initial activation and relatively favorable flatness of plateau in hydrogen pressure-composition isotherm (PCT curve), and thus have been widely studied.

The properties required for the hydrogen storage materials include: easiness of initial activation, large hydrogen storage capacity with large desorption capacity (effective hydrogen capacity) and fast reaction speed with hydrogen with moderate operation temperature (for example, from room temperature to 95° C.), small hysteresis between hydrogen absorption pressure and desorption pressure, favorable flatness of plateau, affordability (inexpensive), and the like. In case of AB5-type alloys, various improvements include addition or substitution of constitutional elements of $LaNi_5$ with other elements were widely studied.

Patent Literature 1 discloses (1) hydrogen storage materials, including an alloy represented by a general formula $LmNi_{a-x}A_x$ (in the formula, Lm is a rare earth metal containing 40 to 70% La, 0.1 to 2.0% Ce, and other metals such as Nd, Pr, and Sm; A is one kind of metal selected from the group consisting of Al, Mn, Fe, and Cr; a satisfies 4.8<a<5.5; and x=0.01 to 2.0), and (2) hydrogen storage materials, including an alloy represented by a general formula $LmNi_{a-x}A_yB_z$ (in the formula, Lm is a rare earth metal containing 40 to 70% La, 0.1 to 20% Ce, and other metals such as Nd, Pr, and Sm; A is one kind of metal selected from the group consisting of Al, Mn, and Fe; B is one kind of metal selected from the group consisting of Mn (except when A is Mn), Co, Zr, and V; a satisfies 4.8<a<5.5; x=y+z; and y, z=0.01 to 2.0). Patent Literature 1 also discloses that with the above constitution, hydrogen storage materials those are easily activated at normal temperature, with large hydrogen absorption amount, high rate of absorption and desorption, small hysteresis, and flatness of plateau.

Patent Literature 2 discloses hydrogen storage materials characterized by including one kind of Al or Sn and Co, represented by a general formula $R·Ni_{5-(a+b+c)}·A_a·B_b·Co_c$ (where R is a rare earth metal or a mixture of a rare earth metal; A is one kind of Mn, Fe, and Cr; B is one kind of Al and Sn; and a, b, and c are each 0.01 to 1.0), and (2) hydrogen storage materials characterized by including one kind of Al or Sn and Co, represented by a general formula $R·Ni_{5-(a+b+c+d)}·A_a·B_b·C_c·Co_d$ (where R is a rare earth metal or a mixture of a rare earth metal; A and B are each one kind of metal of Mn, Fe, and Cr and different from each other; C is one kind of Al and Sn; and a, b, c, and d are each 0.01 to 1.0). Patent Literature 2 also discloses that by adding Co and Al or Sn together with one kind or two kinds of Mn, Fe, and Cr to a R-Ni-type alloy, the absorption amount is increased, and the hysteresis is reduced.

CITATION LIST

Patent Literature

Patent Literature 1: JP S60-70154 A
Patent Literature 2: JP S63-47345 A

SUMMARY OF INVENTION

Technical Problem

However, hysteresis between hydrogen pressure-composition isotherm (hereinafter, may be referred to as the PCT curve) of absorption and that of desorption of materials disclosed Patent Literature 1 is still large, and further improvement is necessary for practical utilization. In the invention of Patent Literature 2, although reduction of hysteresis has been made by addition or substitution of constitutional elements, however, in this case, relatively large amount of expensive Co is used, and some problems such as hydrogen absorption and desorption rate and cost issue are not solved.

Thus, an object of the present invention is to provide low-cost hydrogen storage materials having hydrogen absorption (storage) and desorption properties suitable for hydrogen storage. Specifically, an object of the present invention is to provide hydrogen storage materials with large hydrogen storage capacity and large desorption capacity (effective hydrogen capacity) which could be operated under moderate temperature (for example, from room temperature to 95° C.), and has small hysteresis between absorption PCT curve and desorption PCT curve. Furthermore, an object of the present invention is to provide a hydrogen storage container containing low-cost hydrogen storage materials having suitable properties for hydrogen storage, and a hydrogen supply apparatus including the hydrogen storage container.

Solution to Problem

As a result of conducting diligent studies in order to solve the above problems, the present inventors have found that alloys having composition containing specific rare earth elements and transition metal elements based on $LaNi_5$ have small hysteresis, clear squareness in the PCT curve, with large hydrogen storage capacity and large desorption capacity (effective hydrogen capacity), good flatness of hydrogen desorption PCT, which contribute stabilization of hydrogen desorption pressure and have completed his invention.

That is, according to the present invention, hydrogen storage materials comprising alloys having elemental composition represented by the following Formula (1) are provided.

[Chem. 1]

$$La_aCe_bSm_cNi_dM_e \qquad (1)$$

where, M is Mn or both of Mn and Co, a satisfies $0.60 \le a \le 0.90$, b satisfies $0 \le b \le 0.30$, c satisfies $0.05 \le c \le 0.25$, d satisfies $4.75 \le d \le 5.20$, e satisfies $0.05 \le e \le 0.40$, $a+b+c=1$, and $d+e$ satisfies $5.10 \le d+e \le 5.35$.

According to the invention of another aspect of the present invention, provided are hydrogen storage containers containing the above hydrogen storage materials and hydrogen supply apparatuses including the hydrogen storage containers.

Advantageous Effects of Invention

The hydrogen storage materials of the present invention having the above-described specific elemental composition have excellent hydrogen absorption and desorption properties and can be suitably used for hydrogen storage.

DESCRIPTION OF EMBODIMENTS

Figure 1:
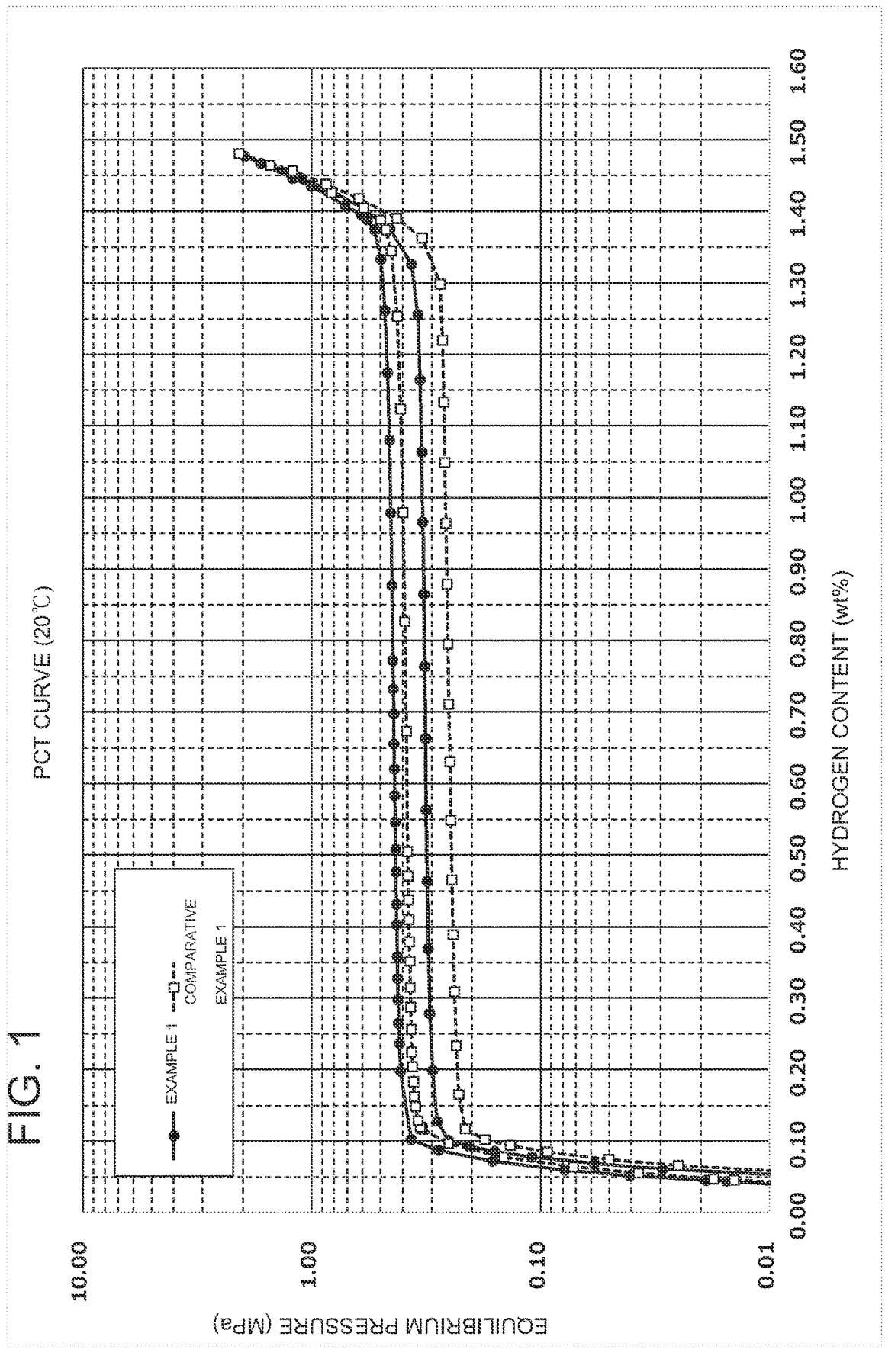
FIG. 1 shows hydrogen pressure-composition isotherms (PCT curves) of the alloy powder in Example 1 and the alloy powder in Comparative Example 1, measured at 20° C. The y-axis indicates the hydrogen absorption pressure during hydrogen absorption and the hydrogen desorption pressure during hydrogen desorption.

Hereinafter, the present invention will be described in detail. The hydrogen storage materials of the present invention are materials comprising alloys having elemental composition represented by the following Formula (1). The hydrogen storage materials are preferably materials consisting of the alloys of the present invention. Hereinafter, the alloys having elemental composition represented by Formula (1) may also be referred to as an alloy or alloys of the present invention.

[Chem. 2]

$$La_aCe_bSm_cNi_dM_e \qquad (1)$$

where, M is Mn or both of Mn and Co, a satisfies $0.60 \le a \le 0.90$, b satisfies $0 \le b \le 0.30$, c satisfies $0.05 \le c \le 0.25$, d satisfies $4.75 \le d \le 5.20$, e satisfies $0.05 \le e \le a+b+c=1$, and $d+e$ satisfies $5.10 \le d+e \le 5.35$.

In Formula (1), a, b, c, d, and e, represent content of the respective elements by atomic ratio, and detailed description thereof is as follows. Hereinafter, the content ratio may be referred to as a "content" or an "amount".

La is effective in increasing the hydrogen absorption amount of invented alloys, and a, which represents the content of La in Formula (1), satisfies $0.60 \le a \le 0.90$. The lower limit of a is preferably $0.65 \le a$ and more preferably $0.68 \le a$, and the upper limit of a is preferably $a \le 0.85$. In a case of a is smaller than the lower limit, the effect of increasing of the hydrogen absorption amount may not be enough, and in a case of a larger than the upper limit, the equilibrium pressure may be too reduced.

Ce is effective in raising the equilibrium pressure of invented alloys, and b, which represents the content of Ce in Formula (1), satisfies $0 \le b \le 0.30$. The lower limit of b is preferably $0 < b$, and the upper limit of b is preferably $b \le 0.25$ and more preferably $b \le 0.22$. In a case of b is larger the upper limit, the hysteresis of the PCT curve may be worsen.

Sm is effective in raising the equilibrium pressure and is also effective in improving of squareness in the PCT curve for invented alloys. c, which represents the content of Sm in Formula (1), satisfies $0.05 \le c \le 0.25$. The lower limit of c is preferably $0.07 \le c$ and more preferably $0.10 \le c$, and the upper limit of c is preferably $c \le 0.23$. In a case of c is smaller than the lower limit, the effect of raising the equilibrium pressure may not be enough and the effect of improvement of squareness in the PCT curve may not be attained, and in a case of c is larger than the upper limit, the hydrogen absorption amount may be reduced. In this regard, the squareness refers to the squareness between plateau region and steep pressure dropping region toward end of desorption for desorption PCT curve, thus, improvement of squareness of materials could be regarded as increasing their effective hydrogen capacity. This squareness in the present application will be used as index in later.

Ni is effective in improving the durability of the hydrogen storage alloys according to the present invention and reducing the hysteresis, and d, which represents the content of Ni in Formula (1), satisfies $4.75 \le d \le 5.20$. The lower limit of d is preferably $4.80 \le d$, and more preferably $4.85 \le d$. In a case of d is smaller than the lower limit, the effect of improving the durability and the effect of reducing the hysteresis may not be enough, and in a case of d is larger than the upper limit, the hydrogen absorption amount may be reduced.

M is Mn alone or combination of Mn and Co, and is effective in reducing hysteresis of the PCT curve of invented alloys. e, which represents the content of M in Formula (1), satisfies $0.05 \le e \le 0.40$. The lower limit of e is preferably $0.07 \le e$. The upper limit of e is preferably $e \le 0.35$, and more preferably $e \le 0.32$. In a case of e is smaller than the lower limit, the effect of reducing hysteresis of the PCT curve may not be enough, and in a case of e is higher than the upper limit, the equilibrium pressure may be too low, and the reaction speed of hydrogen absorption and desorption may worsen.

$d+e$ in Formula (1) represents the sum of the contents of Ni and M. The value of $d+e$ affects the hysteresis of the PCT curve and the hydrogen storage amount of the materials of the present invention, and by adjusting the value of $d+e$ to be within the following range, alloys, which have small hysteresis of the PCT curves while maintaining the sufficient hydrogen storage capacity, can be obtained. $d+e$ satisfies $5.10 \le d+e \le 5.35$, and the lower limit of $d+e$ is preferably $5.12 \le d+e$.

As described above, both Sm and M in Formula (1) are elements effective in raising the equilibrium pressure during hydrogen absorption or desorption, improving the squareness in the PCT curve, and reducing the hysteresis of the PCT curve of invented alloys. In addition, these effects can be enhanced when both elements are applied simultaneously in Formula (1). In Formula (1), $c+e$ satisfies preferably $0.20 \le c+e \le 0.50$ and more preferably $0.20 \le c+e \le 0.45$.

The elemental composition of the alloys of the present invention can be confirmed by quantitative analysis using an Inductively Coupled Plasma (ICP) analysis apparatus. In the present specification, unless specified, otherwise, the alloys of the present invention refer to the alloys having the elemental composition in accordance with Formula (1).

The alloys of the present invention may contain inevitable impurities derived from raw materials and the like. Examples of the inevitable impurities include, but are not limited to, Pr, Nd, and Al. The acceptable amount of inevitable impurities in the alloys of the present invention is 0.5 mass % or less.

The alloys of the present invention can be obtained as alloy flakes or other shapes as described later. The average grain size of crystal in the alloy flake or slab is preferably 25 to 250 μm and more preferably 40 to 230 μm. The average grain size of crystal can be measured as follows. The alloy flake or slab was embedded in a normal temperature curable-type resin (for example, an epoxy resin), the resin was cured, embedded alloy was subjected to being cut and precision polishing using a wet polishing machine, and finally the polished cross-section with mirror-like surface was obtained. Next, for example, the cross section of the alloy is etched with a 0.1M nitric acid aqueous solution, then a polarization microscope is used to measure the lengths of the major axial diameter and the minor axial diameter of each grain, and the grain size of the crystal is defined as "(length of the major axial diameter+length of the minor axial diameter)/2". The grain size is measured in this way, and the average of three grain size per alloy flake or slab is taken as the average grain size. The size of the alloy flake or slab for measuring the crystal grain size is not particularly limited. For example, an alloy slab of about 1 cm$^3$ may be used. Further, the grain size may be measured by using an alloy flake of about 1 cm$^2$, and in that case, the average grain size is preferably 25 to 250 μm.

Invented alloys fulfill following equation [{ln($P_{a1}$)−ln($P_{a2}$)}/0.2]≤1.40 in which, $P_{a1}$ and $P_{a2}$ are equilibrium pressure at 0.3 wt % H$_2$ and 0.1 wt % H$_2$ obtained from desorption PCT curve at 20° C., respectively. The materials fulfilling the above expression possess good squareness for desorption PCT curve and their effective hydrogen storage capacities are increased, thus these materials are preferable for hydrogen storage. The results obtained from above expression are regard as the index of "squareness" of PCT curves for hydrogen desorption. In order to obtain more precise $P_{a2}$, it is preferable to measure the hydrogen desorption pressure for several points between 0.08 wt % to 0.12 wt %.

It is preferable that, invented alloys fulfill following equation [{ln($P_{a3}$)−ln($P_{a1}$)}/0.8]≤0.35, and more preferable that [{ln($P_{a3}$)−ln($P_{a1}$)}/0.8]≤0.28 in which, $P_{a1}$ and $P_{a3}$ are equilibrium pressure at 0.3wt % H$_2$ and 1.1 wt % H$_2$ for desorption PCT curve at 20° C., respectively. The materials fulfilling the above expression possess good hydrogen desorption capability such as during hydrogen desorption, equilibrium pressure is well maintained and almost all of absorbed hydrogen corresponding to plateau region could be desorbed from alloys and utilized in related (connected) apparatus and so on. In addition, the relationship of the above expression is used as the index of "plateau flatness for hydrogen desorption curves".

Further, it is preferable that, invented alloys fulfill following equation ln($P_{b1}$/$P_{b2}$)≤0.43, in which, Pb$_1$ and Pb$_2$ are equilibrium pressure of absorption for absorption PCT curves and that of desorption for desorption PCT curves with 0.8wt % H$_2$ at 20° C., respectively. The materials with hysteresis of PCT curves fulfilling the above expression possess small hysteresis, which means the materials require moderate hydrogen pressure for hydrogen storage and/or require moderate heat for hydrogen desorption which could improve total running efficiency of storage system by using the invented hydrogen storage materials. Of course, above expression of "hysteresis of the PCT" could be used as index for evaluation.

Further, preferable hydrogen desorption pressure $P_{b2}$ of the invented alloys at a hydrogen absorption amount of 0.8 wt % at 20° C. is 0.05 MPa or higher, and more preferably 0.07 MPa or higher. Such alloys possess good hydrogen desorption properties between room temperature and 95° C. Though there is no particular upper limit in $P_{b2}$, so, for example, $P_{b2}$ is adjusted about 1.00 MPa at 20° C.

It is particularly preferable that the invented alloys which form the invented hydrogen storage materials fulfill the above-mentioned relationships related with PCT curves, also, the invented alloys which partially do not satisfy mentioned relationships are acceptable.

Next, a method for producing the hydrogen storage materials of the present invention will be described. First, examples of the method for preparing the alloys include strip casting methods such as a single roll method, a twin roll method and a disk method, and a permanent mold casting method.

For example, in the strip casting method, raw materials blended so that the casted alloy will has a desired composition are prepared. The blended raw materials are then melted by heating in an inert gas atmosphere such as Ar to obtain a molten alloy, the molten alloy reached adequate temperature, then the molten alloy is poured on a water-cooled copper roll, rapidly cooled and solidified, thereby alloy flakes are obtained. In the case of permanent mold casting method, a molten alloy is obtained in the same manner as mentioned above, in this method, the molten alloy is poured into a water-cooled copper (or iron) mold, and molten alloys are cooled, solidified and then an ingot or slab is obtained. Usually cooling rate of the strip casting method is much higher than that of the permanent mold casting method, so the strip casting method is generally more preferable than mold casting in order to obtaining alloy flakes with less segregation and uniform element distribution. Depression of segregation and uniformity of elemental distribution are very important for the invented alloys which form the invented hydrogen storage materials, therefore the strip casting method is a preferred method in the present invention as alloy production method.

Note that, in the case of strip casting methods, the preferrable cooling rate of the molten alloy for producing the alloy flakes, is as follows. The cooling rate of molten alloy between liquidus temperature of the molten alloys and 1000° C. is set to be 300° C./sec or higher. The cooling rate is preferably 700° C./sec or higher, more preferably 1000° C./sec or higher, and particularly preferably 4000° C./sec or higher. Though there is no particular upper limit for the cooling rate, the upper limit is practically about 20000° C./sec or lower. Liquidus temperature of the molten alloys are usually within about 1300 to 1500° C., though the temperature varies strongly depending on the alloys' composition.

The cooling rate below 1000° C. is not particularly limited, and for example, in a case of the strip casting method, after being detached from the roll, the alloy flakes may be collected at a temperature of, for example, 100° C. or lower by being cooled.

Furthermore, in order to obtain alloys having a more uniform composition distribution, it is preferable that the alloy flakes obtained by the cooling is subjected to a heat treatment. The heat treatment can be performed within a range of 700° C. or higher and 1200° C. or lower in an inert gas atmosphere such as Ar. The heat treatment temperature is preferably 950° C. or higher and 1150° C. or lower, and the heat treatment time is 1 hour or more and less than 24 hours and preferably 3 hours or more and less than 15 hours.

Next, the alloy flakes obtained by the casting is ground in order to obtain alloy powder. The grinding can be performed by using a known grinder. Average particle size of the alloy powder is preferably 800 μm or smaller and more preferably 500 μm or smaller. Though it is not necessary to specifically define the smaller limit of the particle size of the alloy powder, the smaller limit is practically about 0.1 μm. Here, the particle size of the alloy powder refers to a diameter measured by a sieve shaker (Ro-Tap).

The hydrogen storage materials of the present invention may be such alloy powder, a composite obtained by mixing the alloy powder with a resin or the like and molding the mixture into an arbitrary form such as a granular form, or articles attached on temperature-controllable apparatus. In this case, the resin functions as a binder for the alloy powder. The mixing can be performed by a known method. For example, the mixing can be performed using a mortar, or using a rotary mixer such as a double cone rotary mixer or a V-type rotary mixer, a stirring mixer such as a blade-type stirring mixer or a screw-type stirring mixer, or the like. It is also possible to perform the mixing while grinding the alloy flakes and the binder using a grinder such as a ball mill or an attritor mill.

Hydrogen storage containers of the present invention contain the hydrogen storage materials disclosed above, and as for the materials and shapes of the containers, known materials and a known shape can be used.

A hydrogen supply apparatus of the present invention includes the hydrogen storage container, and as for the configurations other than the container with the invented hydrogen storage materials, known configurations can be used.

EXAMPLES

Hereinafter, the present invention will be described in detail with examples of this invention and Comparative Examples as reference, but the present invention is not limited thereto. In the descriptions of Examples, the alloys of the present invention and the alloys in Comparative Examples (Comparative examples are the alloys not included the present invention) are all referred to as an "alloy" or "alloys". In addition, an alloy obtained in shape of flakes by the strip casting method is referred to as alloy flakes, and a product obtained by grinding the alloy flakes is referred to as alloy powder.

Example 1

Raw materials were weighed so that finally obtained alloys had the elemental composition shown in Table 1 and melted in a high frequency melting furnace in an argon gas (Ar) atmosphere, thereby molten alloy was prepared. The molten alloy was rapidly cooled and solidified by using a strip casting method, molten alloy was poured at molten temperature of around 1500° C. on a water-cooled copper roll in strip-cast apparatus, and alloy flakes with an average thickness of about 0.3 mm were obtained. Liquidus temperature of the molten alloy was around 1450° C. and the cooling rate during casting between liquidus temperature and 1000° C. was between 6000° C./sec and 9000° C./sec.

The alloy flakes obtained above were subjected to a heat treatment by being kept it in an Ar atmosphere at 1030° C. for 10 hrs by using a heat treatment furnace. For cross-section observation, the heat-treated alloy flakes were embedded in an epoxy resin, the resin was cured and subjected to being cut and precision polishing using a wet polishing machine, and an alloy with mirror-like cross sections was prepared. Then the cross section of the alloy was etched with a 0.1M nitric acid aqueous solution. The average grain size of crystal in the alloy was obtained by using a polarization microscope (manufactured by Olympus Corporation) with the above-described method. In this alloy, the average grain size was 110 μm.

After the heat treatment, the heat-treated alloy flakes were also ground by using a stainless-steel mortar, and then alloy powder with particle size of under 500 μm was obtained using a sieve having opening size of 500 μm.

PCT curves of the alloy powder were obtained by using an automatic high pressure Sieverts apparatus for PCT measurement (manufactured by Fuse Technonet Co., LTD.). The alloy powder was inserted the measurement tube and the tube was connected to Sieverts apparatus, then the measurement tube was placed in oil bath and kept targeted temperature. The measurement tube with alloy powder was vacuumed at 80° C. under around 2.5 Pa (for example 0.5 to 2.5 Pa) for lhr and then initial activation was conducted with following procedure. Hydrogen was provided measurement tube at 0° C. and hydrogenation of alloy powder (hydrogen absorption) taking place, hydrogen pressure was increased up to 2.5 MPa. After saturated with 2.5 MPa of hydrogen, hydrogen was removed (hydrogen desorption) at 80° C. for 0.5 hr (under around 2.5 Pa), then alloy powder was saturated with 2.5 MPa of hydrogen again, this hydrogen desorption/absorption cycle was conducted 2 times as initial activation and then vacuumed 80° C. for 2 hrs (under around 2.5 Pa). The hydrogen absorption and desorption equilibrium pressures of ally powder was measured between 0.01 MPa and 2.0 MPa at 20° C. The obtained hydrogen pressure-composition isotherms (PCT curves) are shown in FIG. 1.

Hydrogen content of alloy powder for hydrogen absorption with 1.0 MPa of $H_2$, and hydrogen desorption pressure at 0.8 wt % $H_2$ were obtained from absorption PCT curve and desorption PCT curve, respectively. Results are summarized in Table 1.

The squareness of the PCT curve of hydrogen desorption for the alloy powder was calculated by using equation $\{\ln(P_{a1})-\ln(P_{a2})\}/0.2$ where $P_{a1}$ is desorption pressure at 0.3 wt % $H_2$ and $P_{a2}$ at 0.1wt % $H_2$, respectively, obtained from PCT curve. The results are summarized in Table 1.

The plateau flatness in the PCT curve of hydrogen desorption for the alloy powder was calculated by using equation $\{\ln(P_{a3})-\ln(P_{a1})\}/0.8$ where $P_{a1}$ is desorption pressure at 0.3 wt % $H_2$ and $P_{a3}$ at 1.1wt % $H_2$, respectively obtained from PCT curve. The results are summarized in Table 1.

The hysteresis of the PCT curves for the alloy powder was calculated by using equation In (Pbi/Pb2) where Pbi is absorption pressure at 0.8 wt % $H_2$ for absorption curve, and $P_{b2}$ is desorption pressure at 0.8 wt % $H_2$ for desorption curve, respectively, obtained from PCT curves. The results are summarized in Table 1.

Examples 2 to 11 and 13

Alloy flakes and alloy powder of each Example were prepared in the same manner as in Example 1 with different chemical composition shown in Table 1, and the hydrogen absorption and desorption properties (squareness and the like) were measured. During alloys preparation pouring temperatures, liquidus temperatures of molten alloys and cooling rates of molten alloys of these Examples between liquidus temperature and 1000° C. were 1500° C., around 1450° C., and between 6000° C./sec and 9000° C./sec, respectively, all of which were approximately the same as those in Example 1. The results are summarized in Table 1.

Comparative Example 1 through 4 are summarized in Table 1. Pouring temperatures, liquidus temperatures, and cooling rates of molten alloys between liquidus temperature and 1000° C. of these Comparative Examples were 1500° C., 1450° C., and between 6000° C./sec and 9000° C./sec, respectively, which were approximately the same as those in Example 1.

TABLE 1

| | Composition (atomic ratio) | | | | | | | Hydrogen absorption amount (wt %) at 1.0 Mpa | Hydrogen desorption pressure (Mpa) at 0.8 wt % | Plateau | | |
| --- | --- | --- | --- | --- | --- | --- | --- | --- | --- | --- | --- | --- |
| | a(La) | b(Ce) | c(Sm) | d(Ni) | e(Mn) | e(Co) | Al | d + e | | | Squareness | flatness | Hysteresis |
| Example 1 | 0.77 | 0.05 | 0.18 | 5.12 | 0.14 | — | — | 5.26 | 1.43 | 0.32 | 0.95 | 0.10 | 0.32 |
| Example 2 | 0.77 | 0.10 | 0.13 | 5.07 | 0.14 | 0.05 | — | 5.26 | 1.45 | 0.33 | 0.85 | 0.11 | 0.39 |
| Example 3 | 0.75 | 0.12 | 0.13 | 5.04 | 0.14 | 0.08 | — | 5.26 | 1.44 | 0.37 | 0.78 | 0.11 | 0.37 |
| Example 4 | 0.69 | 0.18 | 0.13 | 4.96 | 0.20 | 0.10 | — | 5.26 | 1.43 | 0.34 | 0.90 | 0.11 | 0.36 |
| Example 5 | 0.75 | 0.12 | 0.13 | 5.02 | 0.14 | 0.10 | — | 5.26 | 1.43 | 0.36 | 0.72 | 0.10 | 0.35 |
| Example 6 | 0.77 | 0.10 | 0.13 | 5.12 | 0.14 | — | — | 5.26 | 1.44 | 0.33 | 0.58 | 0.13 | 0.43 |
| Example 7 | 0.77 | 0.05 | 0.18 | 5.16 | 0.10 | — | — | 5.26 | 1.41 | 0.42 | 0.61 | 0.12 | 0.32 |
| Example 8 | 0.77 | 0.03 | 0.20 | 5.16 | 0.10 | — | — | 5.26 | 1.41 | 0.39 | 0.71 | 0.14 | 0.30 |
| Example 9 | 0.77 | — | 0.23 | 5.16 | 0.05 | — | — | 5.21 | 1.40 | 0.41 | 0.61 | 0.26 | 0.27 |
| Example 10 | 0.77 | — | 0.23 | 5.11 | 0.05 | — | — | 5.16 | 1.41 | 0.36 | 0.51 | 0.22 | 0.29 |
| Example 11 | 0.79 | 0.06 | 0.15 | 5.16 | 0.10 | — | — | 5.26 | 1.42 | 0.38 | 0.95 | 0.10 | 0.36 |
| Example 12 | 0.69 | 0.18 | 0.13 | 4.96 | 0.20 | 0.10 | — | 5.26 | 1.42 | 0.36 | 1.08 | 0.32 | 0.36 |
| Example 13 | 0.80 | 0.02 | 0.18 | 4.96 | 0.30 | — | — | 5.26 | 1.46 | 0.11 | 0.30 | 0.10 | 0.42 |
| Comparative Example 1 | 0.87 | 0.13 | — | 5.00 | 0.15 | 0.20 | — | 5.35 | 1.44 | 0.26 | 1.83 | 0.13 | 0.42 |
| Comparative Example 2 | 0.73 | 0.27 | — | 4.85 | 0.30 | 0.20 | — | 5.35 | 1.38 | 0.38 | 4.24 | 0.16 | 0.20 |
| Comparative Example 3 | 0.64 | 0.36 | — | 4.42 | 0.18 | 0.50 | — | 5.10 | 1.47 | 0.38 | 2.55 | 0.14 | 0.24 |
| Comparative Example 4 | 0.74 | 0.13 | 0.13 | 4.88 | 0.14 | 0.10 | 0.14 | 5.12 | 1.41 | 0.18 | 2.71 | 0.12 | 0.15 |

Figure 2:
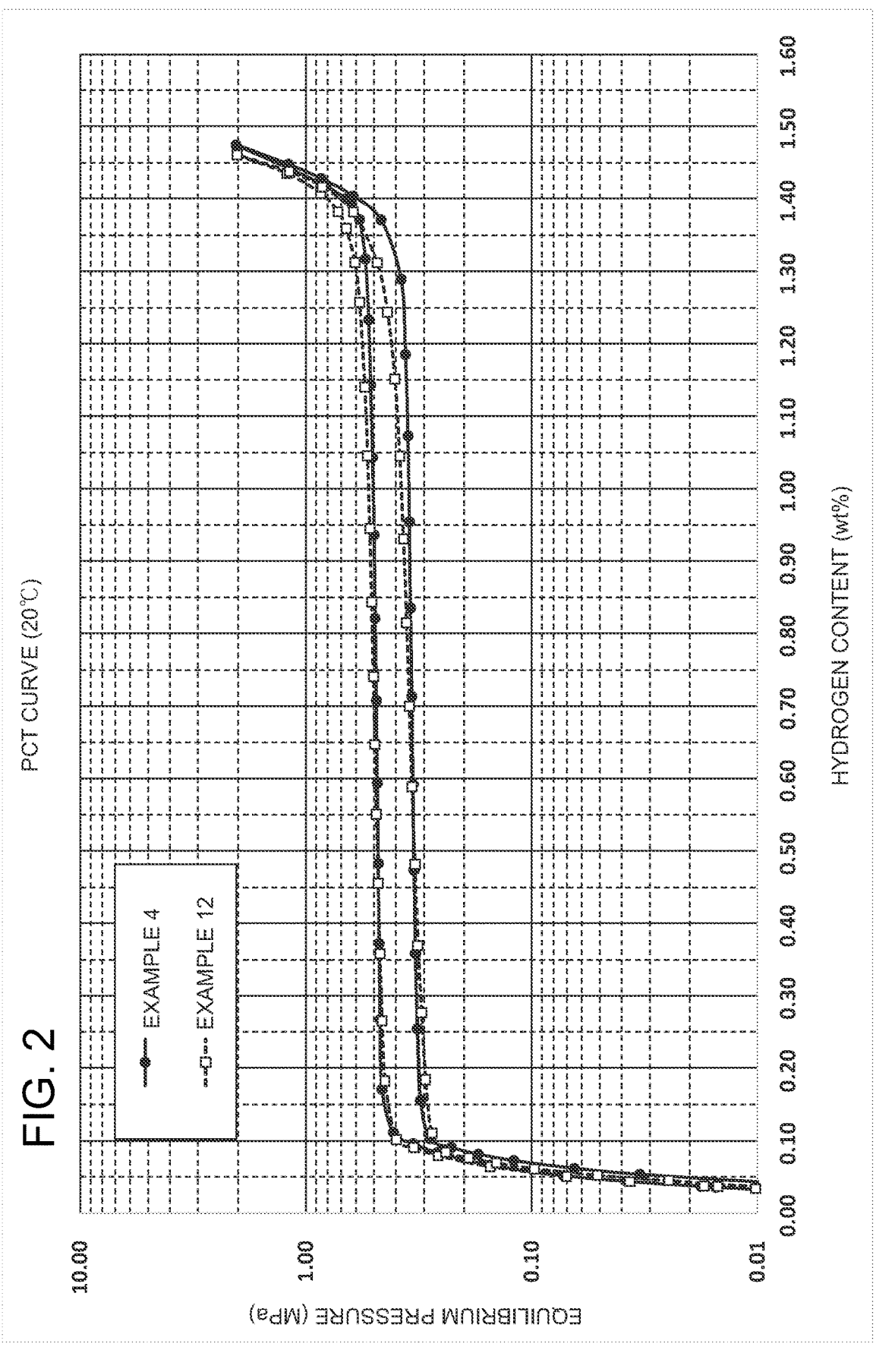
FIG. 2 shows hydrogen pressure-composition isotherms (PCT curves) of the alloy powder in Example 4 and the alloy powder in Example 12, measured at 20° C. The y-axis indicates the hydrogen absorption pressure during hydrogen absorption and the hydrogen desorption pressure during hydrogen desorption.

The hydrogen pressure-composition isotherms (PCT curves) of Example 4 are shown in FIG. 2. The average grain sizes of Examples 2, 4 and 6 were 96 μm, 85 μm, and 105 μm, respectively.

Example 12

Alloy was prepared by using mold cast method. Raw materials were weighed and melted by using a high frequency furnace under argon (Ar) atmosphere and then molten alloy was casted at 1500° C. into an iron mold (permanent mold casting), thickness of obtained alloy (slab) was about 25 mm. Chemical composition of Example 12 is summarized in Table 1. Then, alloy was crushed into powder and hydrogen absorption and desorption properties along with squareness of desorption PCT curve, the flatness of plateau and so on were obtained. PCT curves for Example12 were shown in FIG. 2 and other results were summarized in Table 1. In this case (mold casting), liquidus temperature and cooling rate of molten between liquidus temperature and 1000° C. were around 1450° C. and 5° C./sec, respectively, and averaged grain size was around 749 μm.

Comparative Examples 1 to 4

Alloy flakes and alloy powder of each Comparative Example were prepared in the same manner as in Example 1 with different elemental composition shown in Table 1, and their hydrogen absorption and desorption properties along with squareness of desorption PCT curves, the flatness of plateau and so on were obtained. The hydrogen pressure-composition isotherms (PCT curves) of Comparative Example 1 are shown in FIG. 1. and obtained results for From Table 1, the alloy of each Example has more favorable squareness for PCT curves than those of Comparative Examples which means increasing effective hydrogen desorption capacity of Examples. Each Example absorb hydrogen at normal temperature (for example, at room temperature under moderate hydrogen pressure) and absorbed hydrogen is almost fully desorbed with preferable desorption pressure under room temperature to 95° C. In this invention, hydrogen storage materials with small hysteresis in PCT curves are presented. In addition, invented materials use less amount of cobalt which contribute security of raw (relatively) precious material and reduce materials cost.

The invention claimed is:

1. A hydrogen storage material, comprising:
an alloy having a composition represented by the following Formula (1),

[Chem. 1]

$$La_aCe_bSm_cNi_dM_e \tag{1}$$

where M is Mn or both of Mn and Co, a satisfies $0.60 \leq a \leq 0.90$, b satisfies $0 \leq b \leq 0.30$, c satisfies $0.05 \leq c \leq 0.25$, d satisfies $4.75 \leq d \leq 5.20$, e satisfies $0.05 \leq e \leq 0.40$, $a+b+c=1$, and d+e satisfies $5.10 \leq d+e \leq 5.35$, and wherein the alloy satisfies a relational expression of $\ln(P_{b1}/P_{b2}) \leq 0.43$:

wherein, $P_{b1}$ and $P_{b2}$ are equilibrium pressure of absorption for absorption hydrogen pressure-composition isotherm (PCT) curves and that of desorption for desorption PCT curves with 0.8wt % $H_2$ at 20° C., respectively.

2. The hydrogen storage material according to claim 1, wherein c+e satisfies 0.20≤c+e≤0.50 in the alloy.

3. The hydrogen storage material according to claim 1, the alloy satisfying a relational expression of [{ln($P_{a1}$)−ln($P_{a2}$)}/0.2]≤1.40:

wherein, $P_{a1}$ is desorption pressure at a hydrogen amount of 0.3 wt % and $P_{a2}$ is hydrogen desorption pressure at a hydrogen absorption of 0.1 wt % for a hydrogen pressure-composition isotherm of desorption for the alloy at 20° C.

4. A hydrogen storage container containing:

the hydrogen storage material according to claim 1.

5. A hydrogen supply apparatus comprising:

the hydrogen storage container according to claim 4.

\* \* \* \* \*